United States Patent Office 3,479,206
Patented Nov. 18, 1969

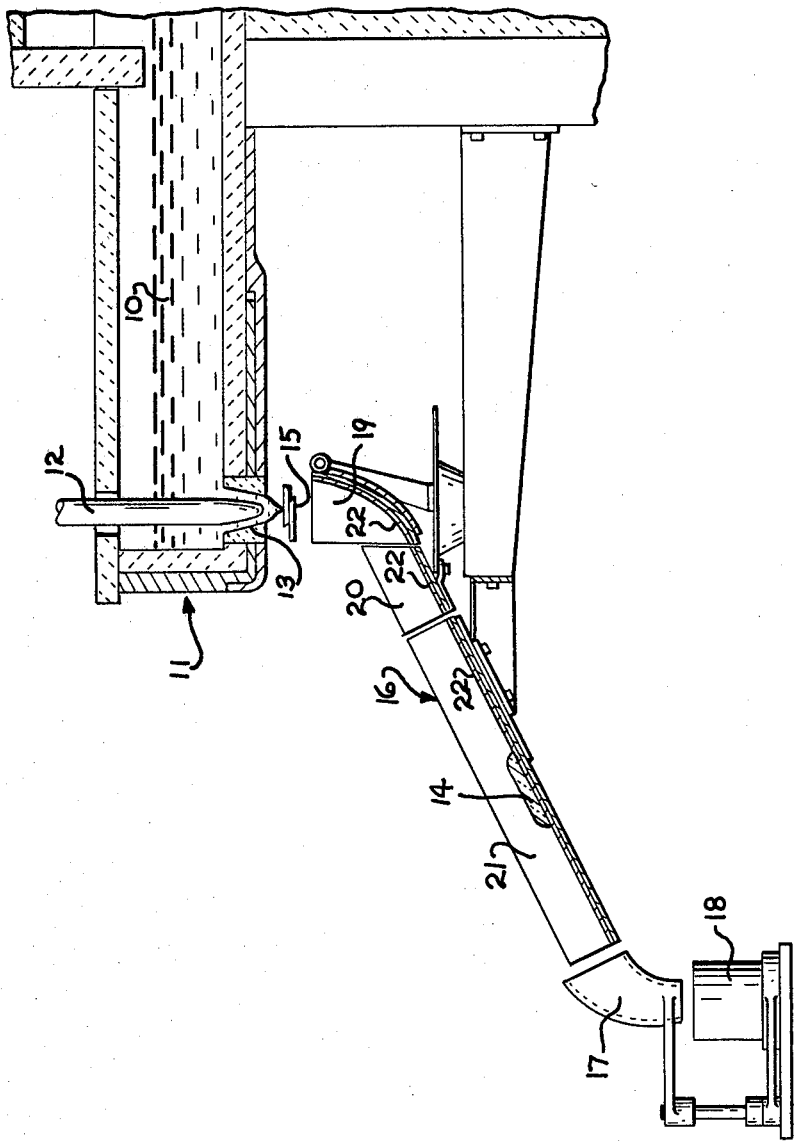

3,479,206
METAL CHUTE COATED WITH FLUOROCARBON POLYMER CONTAINING BORON NITRIDE PLATELETS
John L. Patterson, Toledo, Ohio, assignor to Owens-Illinois, Inc., a corporation of Ohio
Filed Mar. 7, 1966, Ser. No. 532,466
Int. Cl. B44d 1/36, 1/14
U.S. Cl. 117—75                                8 Claims

ABSTRACT OF THE DISCLOSURE

A metal chute adapted to carry molten "gobs" of glass from one place to another due to having on its upper surface a fused coating of a fluorocarbon containing distributed therethrough, also in substantially covering relationship with the surface of the chute, flat crystals or platelets of boron nitride.

---

The present invention relates to glass manufacture generally, and more particularly with that phase of glass manufacturing which is concerned with the handling of glass in the molten state.

Most particularly, the present invention is concerned with improved methods and equipment employed in receiving molten "gobs" of glass as they emerge from a "gob" feeder and directing them to forming equipment such as a mold defining a bottle, tumbler, or the like.

Inclined metal chutes are conventionally employed for receiving intermittent "gobs" (individual charges) of molten glass. They are positioned in such fashion that the molten "gobs" pass downwardly thereon to drop from the delivery end into the forming mold.

Although the conveyance of molten "gobs" of glass as just above described would appear to represent a very simple operation, the reality of commercial operation reveals a number of very perplexing problems. Thus, the success of the ultimate forming operation, in terms of producing a structurally sound and visually acceptable product, depends upon the nature of the "gob" in terms of shape or contour, surface or skin temperature, internal temperature and freedom from contaminants. Thus, the formability (or moldability) of the glass charge or "gob" into an intricate configuration will be influenced by the viscosity of the "gob" which, as indicated, is in turn dependent upon the temperature.

In the past, it has been customary to apply various oils or oil base dopes onto the glass contacting upper surface of the metal chute in order to attempt to speed up the passage of the glass thereon and thereby reduce temperature loss and temperature variation in the "gob." These oily, carbonaceous coatings, while providing the necessary rapidity of travel by reducing the coefficient of friction, were, and are, undesirable in that they impart contaminating substances onto the "gob" through a decomposition of the coating due to heat. The latter also quickly leads to ultimate disappearance of its coating, e.g., they are short lived. To increase the life, it has become very common practice to play an intermittent stream of water upon the chutes, thereby, it is thought, reducing the rate of decomposition of the dope coatings. The water cooling technique, while lending added life to the carbonaceous coatings, is detrimental in that unwanted cooling of the "gob" also occurs. Furthermore, the "gobs" are found to vary in temperature depending upon their proximity to the intermittent stream of water. More importantly, the chilling effect is concentrated at the surface, resulting in the formation of a stiff skin which leads, unless reheating is employed, to a large number of defective articles.

The carbonaceous coatings are also undesirable since a considerable variation in lubrication is experienced, causing the "gob" to frequently become scratched or marred whereby the finished article contains imperfections. This can be fatal both in the formation of weaknesses and, as well, visual defects. The decomposition of the carbonaceous coatings also results in a smoke which undesirably pervades the area to the discomfiture of the workers.

It is accordingly an object of the present invention to provide an improved molten glass conveying member which by reason of a novel surface coating thereon is capable of eminently satisfactory performance without any of the difficulties or defects discussed hereinabove.

It is a particular object of the present invention to provide a securely coated "gob" conveying chute, which coating is resistant to the elevated temperatures imparted thereto by reason of repeated contacts with molten "gobs" of glass.

It is another object of the present invention to provide such a "gob" chute which is possessed of an extremely low coefficient of friction whereby the molten glass "gob" can proceed very rapidly from the receiving end thereof to the delivery end, thereby precluding temperature losses and consequent variations therein leading to "skin" formation.

It is likewise an object of the present invention to provide such an improved coated chute which is long lived, being relatively unaffected by heat, developed by repeated contact with glass "gobs," as well as other substances normally in the glass forming area.

It is still another object of the present invention to provide a coated chute which imparts no contaminants to the molten glass "gob" passing thereover and is, in addition, smokeless in operation.

It is also an object of the present invention to provide such a coated chute member which by reason of the unusual character of the coating avoids the necessity of employing cooling water and thereby is conducive to delivering, to the forming mold, a dry glass "gob" which is of substantially uniform temperature therethrough and which is of practically the same temperature as when formed.

It is additionally an object of the present invention to provide a novel method of treating the glass contacting surfaces of "gob" chutes; which method is easily carried out, requiring neither expensive or extensive auxiliary equipment.

It is still another object of the present invention to provide a unique coating composition which, by reason of the cooperation of the components thereof, imparts to the conveying surface, bearing it, the very desirable properties noted herein.

The foregoing, as well as other objects of the present invention, will become apparent to those skilled in the art from the following detailed description, including specific examples, taken in conjunction with the annexed drawing on which there is presented one embodiment of an apparatus employing the treatment of the present invention.

The accompanying single sheet of drawing comprises a partially sectional elevational view of an apparatus on which the present invention may be employed.

In its simplest embodiment, the present invention contemplates a molten glass "gob" delivery member, such as an inclined chute, bearing, on its upper surface, a heat-fused coating comprising a fluorocarbon (preferably tetrafluoroethylene) polymer having generally uniformly distributed therethrough finely-divided boron nitride.

The present invention further contemplates a novel method of treating or surfacing glass handling members, such as "gob" chutes, by applying thereto an aqueous dispersion of a fluorocarbon (preferably tetrafluoroethylene) polymer in combination with powdered boron nitride and heat fusing said polymer to create a heat-resistant coating of low friction.

Referring now more specifically to the drawing, molten glass 10 resides in a feeder 11. The feeder 11 is of conventional construction and is provided with a plunger 12 vertically reciprocable in an opening 13 for purposes of forming molten "gobs" or molten charges of the molten glass. The "gobs" 14 are severed from the falling stream of glass by shears 15. The severed "gobs" fall freely as influenced by gravity and are thence guided by the chute member 16 to a funnel 17 which in turn directs the molten "gobs" to molds 18. The chute 16 may, in fact, consist of several connected sections bearing reference numerals 19, 20 and 21. In accordance with the present invention, each of the sections 19, 20 and 21 of the chute 16 bears, principally on the upper surface thereof, a heat-resistant coating 22 having a particular composition in accordance with this invention and being applied by a method representing an embodiment of the present invention.

In keeping with the requirements of the patent statutes, there will now be set forth several examples illustrating preferred methods of practicing my invention including conditions and optimum formulations used in preparing the coating compositions employed therein; all being in sufficient detail as to enable one ordinarily skilled in the art to practice the invention.

EXAMPLE I

To 100 parts of a 45.5 percent solids dispersion in water of tetrafluoroethylene polymer was added 15 parts by weight of finely-divided (325 mesh U.S. Screen Series) boron nitride (BN). Tetrafluoroethylene polymer is marketed as an aqueous dispersion by the E. I. du Pont de Nemours & Co., Inc., of Wilmington, Del., under the code designation "851–224." The boron nitride is marketed by Fairmont Chemical Company, of 136 Liberty Street, New York, N.Y. The resulting liquid mixture with the tetrafluoroethylene polymer dispersed therein and the finely-divided boron nitride suspended therein is of sprayable viscosity, e.g., about 350–400 centipoises. (Note: If this liquid coating mixture is allowed to set for any appreciable time, it should be stirred to insure essentially uniform distribution of the polymer and the powdered boron nitride.)

The liquid coating preparations of Example I, as just described, are ready for immediate application to the upper surface of a "gob" chute which has previously been treated as follows. The surface to be coated is given a thorough degreasing with acetone. The solvent-cleaned chute surface is then heated at 750° F. for 30 minutes to insure removal of all of the acetone as well as any residuals. The surface to be coated is next vapor blasted with 80 grit aluminum oxide at a pressure of 80 pounds per square inch gauge. A primer coat of tetrafluoroethylene polymer is then applied by spray application; the polymer being in the form of an aqueous 45 percent solids dispersion. The primer coat is applied in sufficient quantity as to yield, upon baking at 450° F. for 20 minutes, a coating layer measuring 0.1 to 1.0 mil, preferably about 0.6 mil, in thickness. The primer-coated chute is allowed to cool at room temperature and the liquid coating composition of Example I is applied by spray gun. Care is taken to lay down a fairly uniform thickness coating as will yield, on examination after a 20-minute bake at 750° F., a fused coating which is essentially continuous and measuring about 2.5 mils in thickness. The total coating thickness measures about 1.0 to 4.0 mils, preferably 3.0 to 3.1 mils.

A number of "gob" chutes having their upper surfaces treated as just described were installed in the forming section of a commercial glass manufacturing facility maintained and operated by the assignee of the present application. The "gob" chutes handling rather large "gobs," weighing in the neighborhood of 800 grams, endured continuous operation for a period averaging 26 to 33 days before the quality of forming began to fall off, indicating that the coating had deteriorated to the point that a recoating as described was necessary. The "gob" chutes serving to transport relatively light "gobs," weighing in the neighborhood of about 150 grams, lasted on an average of from 35 to 43 days before replacement was necessary with freshly treated "gob" chutes.

In contrast, in the same manufacturing facility, an identical series of "gob" chutes coated with conventional carbonaceous coatings have an observed life expectancy of from 4 to 6 days. Thus, it can be seen that the shortest lived "gob" chutes coated in accordance with the present invention lasted over 4 (26/6) times as long as the most durable of the carbonaceous coating bearing "gob" chutes. Overall the "gob" chutes coated in accordance with the present invention have an average life expectancy of about 35 days, whereas the "gob" chutes bearing the carbonaceous coating last, on the average, 5 days. The foregoing thus demonstrates a ratio of about 7 to 1 in favor of the treatment of the present invention. Additionally, the individual "gobs" and the molded containers produced during this period were observed and the performance was evaluated. As a result, it was observed that with the "gob" chutes bearing the coating of the present invention, the "gob" tracked excellently in the "gob" chute, e.g., the "wear" track line was perfectly straight. Furthermore, there was no smoke created in the equipment. Neither the molds nor the ware, on examination, showed any sign of any carryover of any contaminant as might represent a product of heat decomposition.

A large number of conventional solvents are suitable for use in degreasing the chute surface; for example, xylene, toluene, chlorinated solvents (trichloroethylene, perchloroethylene, carbontetrachloride, chloroform, ethylene dichloride) acetates, petroleum solvents, naphthas, etc.

The tetrafluoroethylene polymers may range in grade from low molecular weight, hard waxy, high melting materials to very high molecular weight polymers having the attribute of readily forming films. The preparation and properties of suitable tetrafluoroethylene polymers are disclosed in U.S. Patent No. 2,230,654 issued to Roy J. Plunkett.

EXAMPLE II

A number of "gob" chutes were coated with an aqueous dispersion of tetrafluoroethylene polymer by spray gun. The coating contained no boron nitride. The "gob" chutes were degreased and grit blasted, and the same heating schedules were employed as in Example I. Installation in a glass manufacturing facility as before revealed that the coating had a life expectancy of from 4 to 28 hours, e.g., less than a day average.

The deposited particles of tetrafluoroethylene polymer when subjected to the final baking, which is desirably conducted at a temperature of from about 700° F. to about 800° F. for from about 10 to 30 minutes, fuses the tetrafluoroethylene particles (originally present in the aqueous dispersion) together to define an essentially continuous vehicle or carrier (matrix, as it were) for the finely-divided boron nitride. The boron nitride as used is in the form of a flat crystal which may also be described as a platelet. These platelets appear, on microscopic examination of the final coat, to assume a generally oriented, overlapped relationship suspended in the fused polymer, thereby defining a structure having a shingled appearance.

Insofar as I have been able to presently determine, the boron nitride should most preferably, in terms of ultimate performance, constitute about 35 percent (%) by weight based upon the amount of tetrafluoroethylene polymer solids. Thus, as can be seen from Example I, the coating included 15 parts by weight of boron nitride and 45.5 parts by weight of polymer solids.

Considering ease of application and, as well, ultimate performance of the coated chute, the tetrafluoroethylene polymer is most conveniently utilized as an aqueous dispersion of polymer solids in an amount ranging from 35 to 55 percent on an oven dry basis. By oven dry basis is meant that 100 grams by weight of the aqueous dispersion, placed in a mild hot air oven maintained at about 100° F. and maintained there until all of the water has evaporated, will weigh from 35 to 55 grams, representing non-volatile polymer solids.

On the basis of fluorocarbon polymer solids, the amount of boron nitride can vary from about 15 to about 60 percent by weight. More preferably, the boron nitride is maintained within a range of about 27 to 43 percent by weight of resin solids.

A number of factors are involved in arriving at the amount of the boron nitride desired. Less than 15 percent boron nitride yields a coating but its performance, in terms of life expectancy, is considerably lower than can be obtained with higher amounts within the ranges noted. Similarly, while more than 60 percent by weight of boron nitride, on the basis of tetrafluoroethylene polymer solids, can be incorporated into the coatings, no appreciable increase in properties is noted, while the integrity of the applied coating appears to suffer as evidenced by some chunking or chipping of the coating.

Boron nitride (BN) of extremely finely-divided form, e.g., about 325 mesh, insures ease of application as well as achievement of the desired results in terms of coating integrity, long life and, as well, low coefficient of friction. The largest particle as will pass a 325 mesh screen (U.S. Screen Series) measures about 44 microns in diameter. Ideally, therefore, the boron nitride selected for inclusion in these coatings should constitute a screen fraction; the major proportion of which does not substantially exceed about 44 microns in particle diameter. Larger particles do not lend improved results and only make the application more difficult.

While there has been disclosed with considerable detail certain preferred manners of performing this invention, it is not intended or desired to be solely limited therefor for, as hitherto stated, the procedure may be modified, the precise proportions of the materials utilized may be varied, and other materials having equivalent properties may be employed if desired, without departing from the spirit and scope of the invention as defined in the appended claims.

I claim:
1. An apparatus for receiving and delivering a "gob" of molten glass which comprises a chute structure having an inclined glass guiding surface, and, bonded to said surface, a coating including a fused fluorocarbon resin polymer and, suspended therein, a plurality of boron nitride platelets in generally overlapped array.

2. An apparatus as claimed in claim 1 wherein said boron nitride platelets constitute from 15 to 60 percent by weight based on fused polymer.

3. A metallic, hot glass conveying article having a surface for contact with molten glass, said surface bearing a continuous, completely covering layer composed of fused tetrafluoroethylene polymer having, distributed therethrough, finely-divided boron nitride in the form of flat crystals or platelets, said boron nitride being present in an amount ranging from about 15 to about 60 percent by weight of the tetrafluoroethylene.

4. An article as claimed in claim 3 wherein the range is about 27 to about 43 percent.

5. An article as claimed in claim 4 wherein said coating is composed of two layers, the one on the bottom being substantially devoid of boron nitride.

6. The article as claimed in claim 5 wherein the bottom coating measures about 0.1 to 1.0 mil in thickness.

7. The article as claimed in claim 6 wherein the upper coating, containing boron nitride, measures about 1.0 to about 3 mils in thickness.

8. The article as claimed in claim 7 wherein said finely-divided boron nitride is composed principally of particles not substantially larger than about 44 microns.

References Cited

UNITED STATES PATENTS

| | | | |
|---|---|---|---|
| 2,201,049 | 5/1940 | Moore | 65—26 |
| 2,562,117 | 7/1951 | Osdal | 260—29.6 |
| 2,758,421 | 8/1956 | Smith | 65—304 |
| 2,798,005 | 7/1957 | Love | 117—132 X |
| 2,813,041 | 11/1957 | Mitchell et al. | 117—132 X |
| 2,817,562 | 12/1957 | Fleming et al. | 117—132 X |
| 2,843,502 | 7/1958 | Fay | 117—132 X |
| 2,873,555 | 2/1959 | Conrad | 65—304 |

WILLIAM D. MARTIN, Primary Examiner

H. J. GWINNELL, Assistant Examiner

U.S. Cl. X.R.

117—132; 65—26, 169, 170, 304